United States Patent [19]

Smialowicz et al.

[11] Patent Number: 5,875,868
[45] Date of Patent: Mar. 2, 1999

[54] INFLATABLE EVACUATION SLIDE

[75] Inventors: Edward H. Smialowicz; Dean H. Staudt, both of Pt. Pleasant; John W. O'Donnell, Brick, all of N.J.

[73] Assignee: Air Cruisers Company, Wall, N.J.

[21] Appl. No.: 794,832

[22] Filed: Feb. 4, 1997

[51] Int. Cl.$^6$ ..................................................... A62B 1/20
[52] U.S. Cl. ............................... 182/48; 182/49; 441/40; 193/25 B; 244/905
[58] Field of Search .......................... 182/48, 49; 441/40, 441/80, 83; 193/25 B; 244/137.2, 905

[56] References Cited

U.S. PATENT DOCUMENTS

| | | |
|---|---|---|
| 3,070,203 | 12/1962 | Hailstone . |
| 3,092,232 | 6/1963 | Adams . |
| 3,370,684 | 2/1968 | Holcombe . |
| 3,473,641 | 10/1969 | Fisher . |
| 3,598,215 | 8/1971 | Summer et al. . |
| 3,712,417 | 1/1973 | Chacko et al. ............................ 182/48 |
| 4,013,247 | 3/1977 | Giffin .................................... 182/48 X |
| 4,246,980 | 1/1981 | Miller ........................................ 182/48 |
| 4,333,546 | 6/1982 | Fisher ....................................... 182/48 |
| 4,378,861 | 4/1983 | Burrough et al. ........................ 182/48 |
| 4,434,870 | 3/1984 | Fisher . |
| 4,519,782 | 5/1985 | Fisher . |
| 5,301,630 | 4/1994 | Genovese et al. .................... 182/48 X |

*Primary Examiner*—Daniel P. Stodola
*Assistant Examiner*—Bruce A. Lev
*Attorney, Agent, or Firm*—Lawrence G. Fridman

[57] ABSTRACT

An inflatable evacuation slide for an aircraft consists of first and second longitudinal support beams, upper and lower transverse support members and a flexible sliding support surface. The first and second longitudinal support members are spaced from each other and formed having proximal and distal ends thereof. The lower support member is transverse to the first and second longitudinal support beams and spaced from the distal ends thereof, so that each longitudinal support beam is formed having an extension portion extending between the lower support member and the distal ends thereof. The flexible sliding support surface is connected to and limited by at least the upper and lower support members.

13 Claims, 4 Drawing Sheets

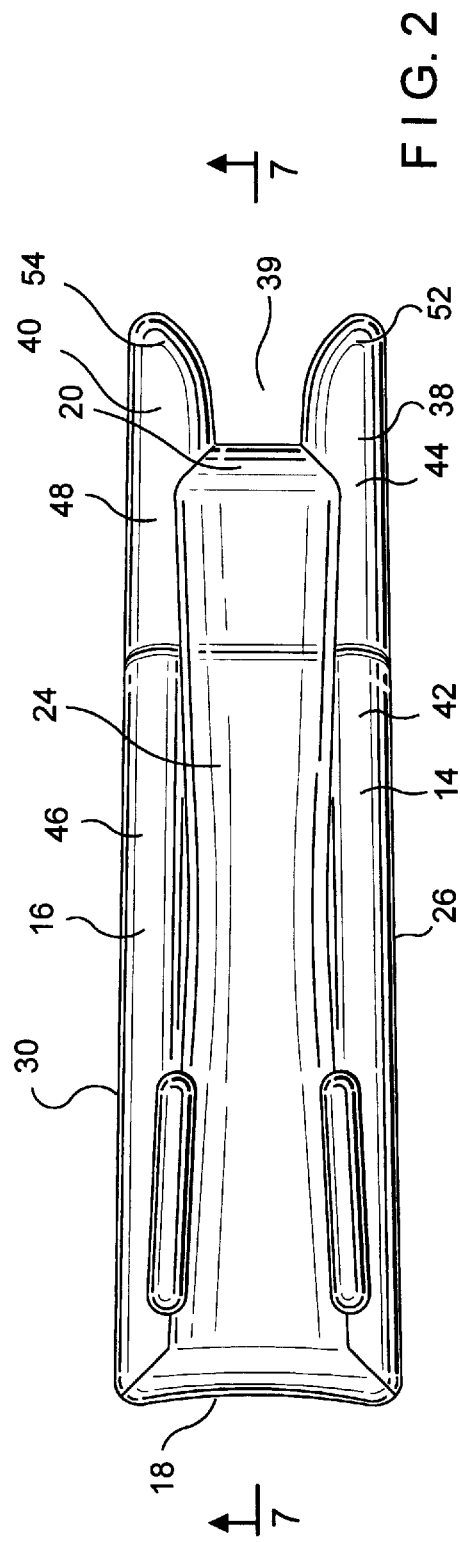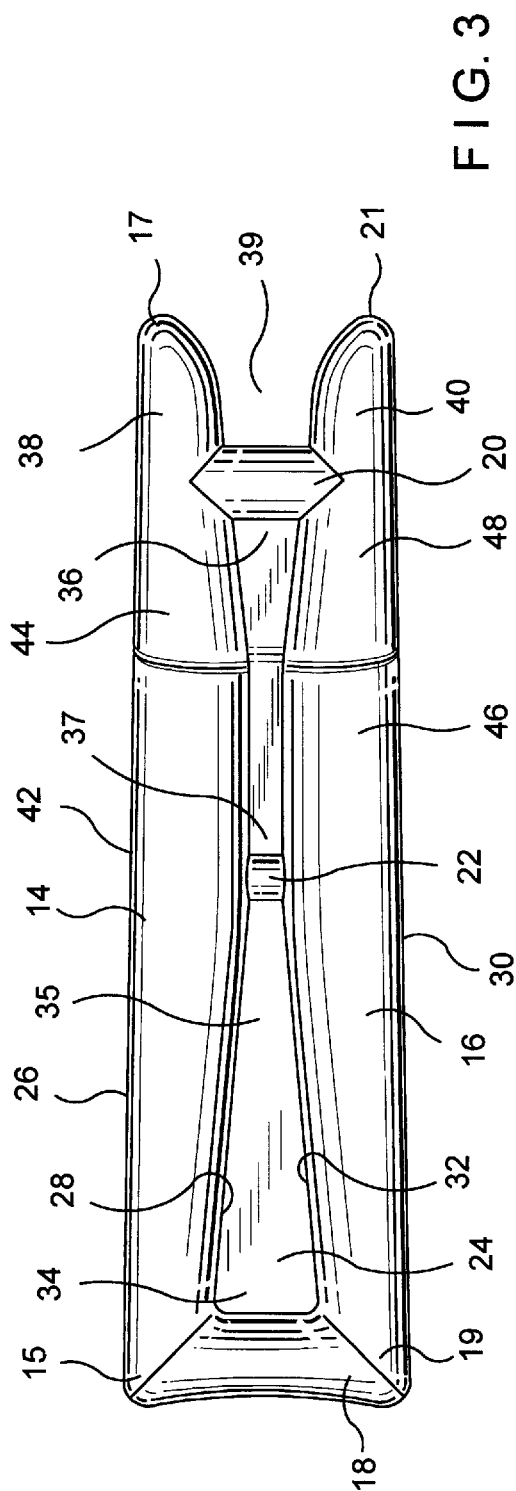

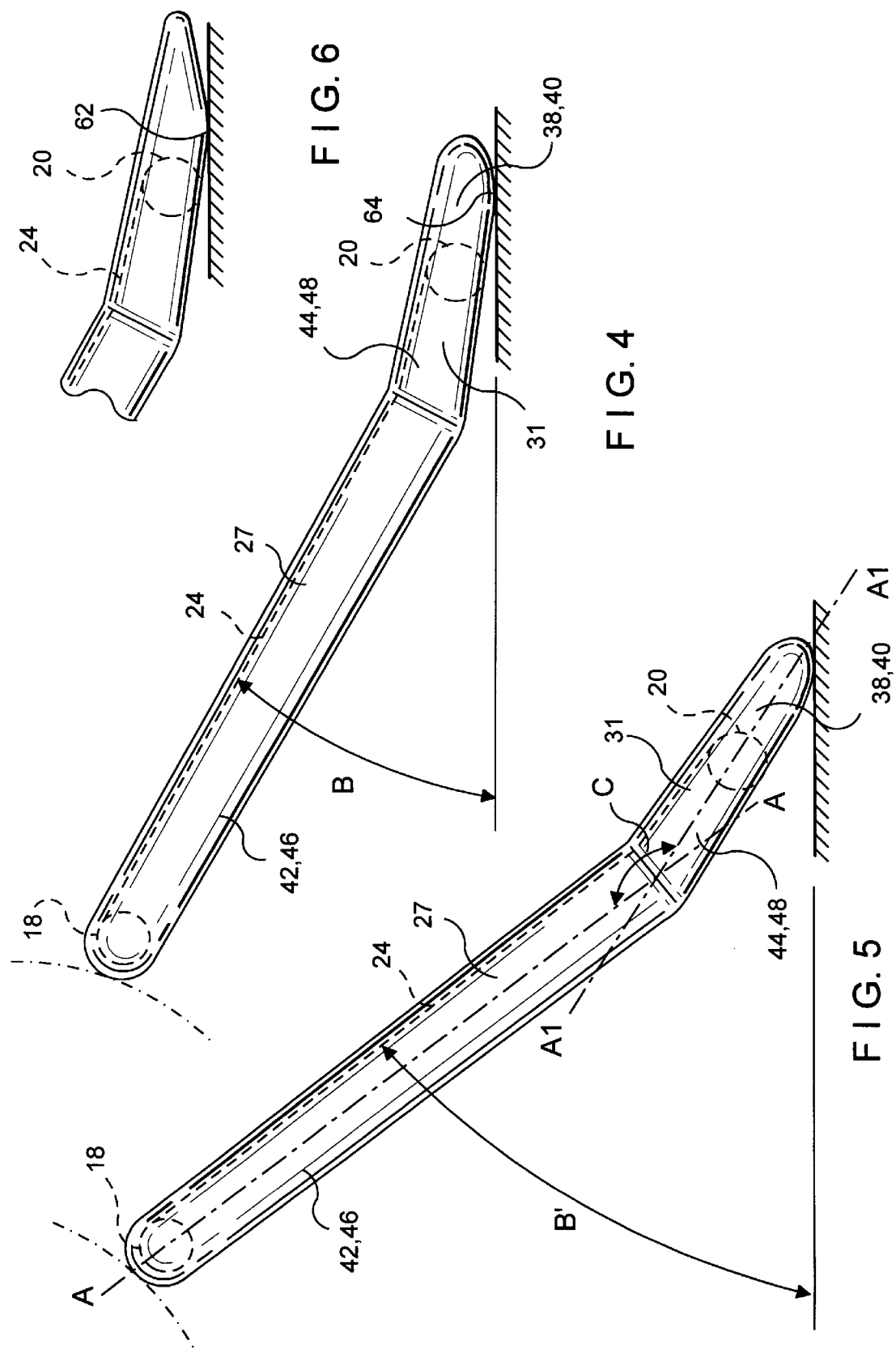

INFLATABLE EVACUATION SLIDE

FIELD OF THE INVENTION

This invention relates to inflatable evacuation slides for aircraft and, more particularly, it relates to inflatable evacuation slides utilizable with variable sill heights thereof.

BACKGROUND OF THE INVENTION

Inflatable evacuation slides are commonly used on passenger-carrying aircraft to provide means for rapid evacuation of passengers in the event of an emergency. The descent of evacuees on an inflatable evacuation slide is in many respects governed by the sliding angle formed between the sliding surface or the floor of the inflatable and the ground. At the shallow sliding angle, in view of the slow rate of descent, the evacuation may not be accomplished fast enough. At the sliding angle above the optimal range, the sliding surface may be too precipitous and evacuees will be reluctant to utilize the slide. However, even if they proceed, injuries might result upon impact with the ground. The problem facing the modern aviation industry is that the same slide is designed and used for both normal sill height, with all landing gear in the extended position, and for the adverse sill height with one or more landing gear or other portions of an aircraft collapsed or damaged. In the latter condition, certain portions of the fuselage can be significantly raised or lowered and the slide should have extra length to accommodate such height variations. Since at the normal sill height, such slide extends further away from the aircraft, situations with a shallow sliding angle can be encountered. This poses two problems. One of such problems is that the speed of the egress of the evacuees can be very slow, so that the passengers cannot be evacuated fast enough within the required short time limits. The other problem associated with a shallow sliding angle is that instead of being transferred into the speed of the evacuees going down precipitously, in view of the lower speed of their movement, the load on the slide actually increases. In such condition, the structure of the slide requires the strength substantially greater than normal. For this purpose, the strength of the longitudinal support beams has to be increased by, for example, providing supplemental tubes underneath the slide. Such inflatable arrangements are expensive to manufacture and less reliable in operation.

Another important issue related to the design of the aircraft slides is that each slide is tailored not only to a particular model of aircraft, but also to a specific door of the same aircraft. This is because in case of emergency landing, each door is at a particular adverse sill height, depending on the condition of the aircraft. For instance, when an aircraft on the ground loses one landing gear or an engine, it might have a nose-up position in which the maximum sill height of front doors would substantially exceed the normal sill height thereof. Therefore, slides utilized at the forward doors of aircraft should require substantially greater length than those at the aft doors.

In view of emergency situations, it is quite difficult to predict the height of a door of aircraft and the value of the sliding angle. This is because one or more of the landing gear and engines of the aircraft can be damaged or collapsed such that the aircraft's fuselage itself may be canted. The height of the escape doors varies significantly depending upon the type of plane and the character of the accident. For example, in view of large size engines requiring longer landing gear, new aircraft are actually positioned higher off the ground than former models. This leads to more extremes in terms of the ranges between normal and adverse sill heights. One of the examples of such aircraft is Boeing 777 requiring a very long slide for the forward door. Such arrangement results in a shallow sliding angle for this door at the normal sill height.

Aircraft often carry hundreds of passengers and safety regulations require that all passengers must be removed from the aircraft in the shortest possible period of time. Thus, all doors, including those furthest from the ground, must be utilized with the result that each must be provided with an escape slide designed to operate efficiently at any height and at any angle.

One example of resolving problems associated with variable sill height of aircraft has been described by U.S. Pat. No. 4,246,980 which the present case incorporates by reference.

Thus, it has been long felt an unsolved need for a simple and reliable inflatable evacuation slide for an aircraft capable of accommodating not only the normal sill height, but also a maximum adverse sill height thereof, while providing safe and expeditious evacuation of passengers.

SUMMARY OF THE INVENTION

One aspect of the invention provides an inflatable evacuation slide for an aircraft including first and second longitudinal support beams, an upper and lower transverse support member and a flexible sliding support surface. The first and second longitudinal support beams are spaced from each other and each is formed with proximal and distal ends. The transverse upper support member interconnects the proximal ends of the first and second longitudinal support beams. The transverse lower support member is spaced from the distal ends of the first and second longitudinal support beams, so that each longitudinal support beam is formed having an extension portion extending between the lower transverse support members and the corresponding distal ends thereof. The flexible sliding support surface is connected to at least the upper and lower support members.

Another aspect of the invention provides the inflatable evacuation slide, wherein each longitudinal support beam includes an exterior area and an interior area, so that the interior areas of the first and second longitudinal support beams face each other to define an interior space therebetween. The flexible support surface is also connected to the first and second longitudinal support beams. The interior space is formed having an upper inwardly tapered interior region and a lower outwardly tapered interior region separated by a restricted region, whereby passengers upon entering the evacuation slide are received by a portion of the sliding support surface corresponding to the inwardly tapered upper interior region, funneled through the restricted region and discharged at the outwardly tapered lower interior region.

According to a further aspect of the invention, the evacuation slide is formed having a cross-sectional outside periphery of the first and second longitudinal support beams at a central part of the slide being larger than a cross-sectional outside periphery of the first and second longitudinal beams at the proximal and distal ends thereof, so that the restricted region is formed substantially between the larger outside periphery areas of the longitudinal support beams. The outwardly tapered lower interior region terminates at a flared portion passenger receiving area which is formed by at least the extension portions of the first and second longitudinal support members. The flared distal portion resembles an end opening of a trumpet. An upper part of the lower support member is positioned below an upper portion of the first and second longitudinal support beams, so that a lower end of the flexible sliding surface is disposed below the upper portion of the longitudinal support beams forming a lateral restraining arrangement for the evacuees.

Still another aspect of the invention provides the inflatable evacuation slide with each longitudinal support beam including its extension portion being formed as one unitary member without any internal separation and the interior of the evacuation slide is one continuous system capable of being simultaneously inflated. A lower part of each extension portion is formed with an arrangement for reducing an engagement area between the extension portion and the ground. The reducing arrangement can be formed either as a curved region or tapered region provided at a lower area of the distal end of the extension portion.

Still further embodiment of the invention provides an inflatable evacuation slide which includes first and second longitudinal support beams, upper and lower transverse support members and a flexible sliding support surface. The first and second longitudinal support beams are spaced from each other and each is formed having proximal and distal ends. The transverse upper support member interconnects the proximal ends of the first and second longitudinal support beams. The lower support member is spaced from the distal ends of the first and second longitudinal support beams, so that each longitudinal support beam is formed having an extension portion extending between the lower support member and the corresponding distal ends of the longitudinal support beams. A flexible sliding support surface is connected to at least upper and lower support members. In operation, at least at a normal sill height level of an aircraft, the extension portions of the first and second longitudinal support beams extend substantially along the ground, so that the effective height of the evacuation slide remains substantially unaffected by said extension portions and at the sill height above the normal level while the evacuation slide is being raised, the effective length of the slide is increased by the extension portions.

As to still another embodiment of the invention, at the sill height above the normal level, the effective length of the evacuation slide is increased substantially by the length of the extension portions. A lower part of each said extension portion is formed with an arrangement for reducing an engagement area between said extension portions and the ground and preventing increase of the effective length of the evacuation slide at least at the normal sill height levels of the aircraft. Each longitudinal support beam including its extension portion is formed as one unitary member substantially without internal separation and the interior of the evacuation slide including interior of each longitudinal support beam is one continuous system capable of being simultaneously inflated.

BRIEF DESCRIPTION OF THE DRAWINGS

Other advantages and features of the invention are described with reference to exemplary embodiments, which are intended to explain and not to limit the invention, and are illustrated in the drawings in which:

FIG. 2 is a top plan view thereof;

FIG. 3 is a bottom plan view thereof;

FIG. 4 is a side elevational view showing the evacuation slide at a normal sill height of an aircraft;

FIG. 5 is a side elevational view of the evacuation slide at the sill height of an aircraft above the normal level;

FIG. 6 is a partial elevational view showing one embodiment of a runway end of the slide.

DESCRIPTION OF THE PREFERRED EMBODIMENT

Figure 1:
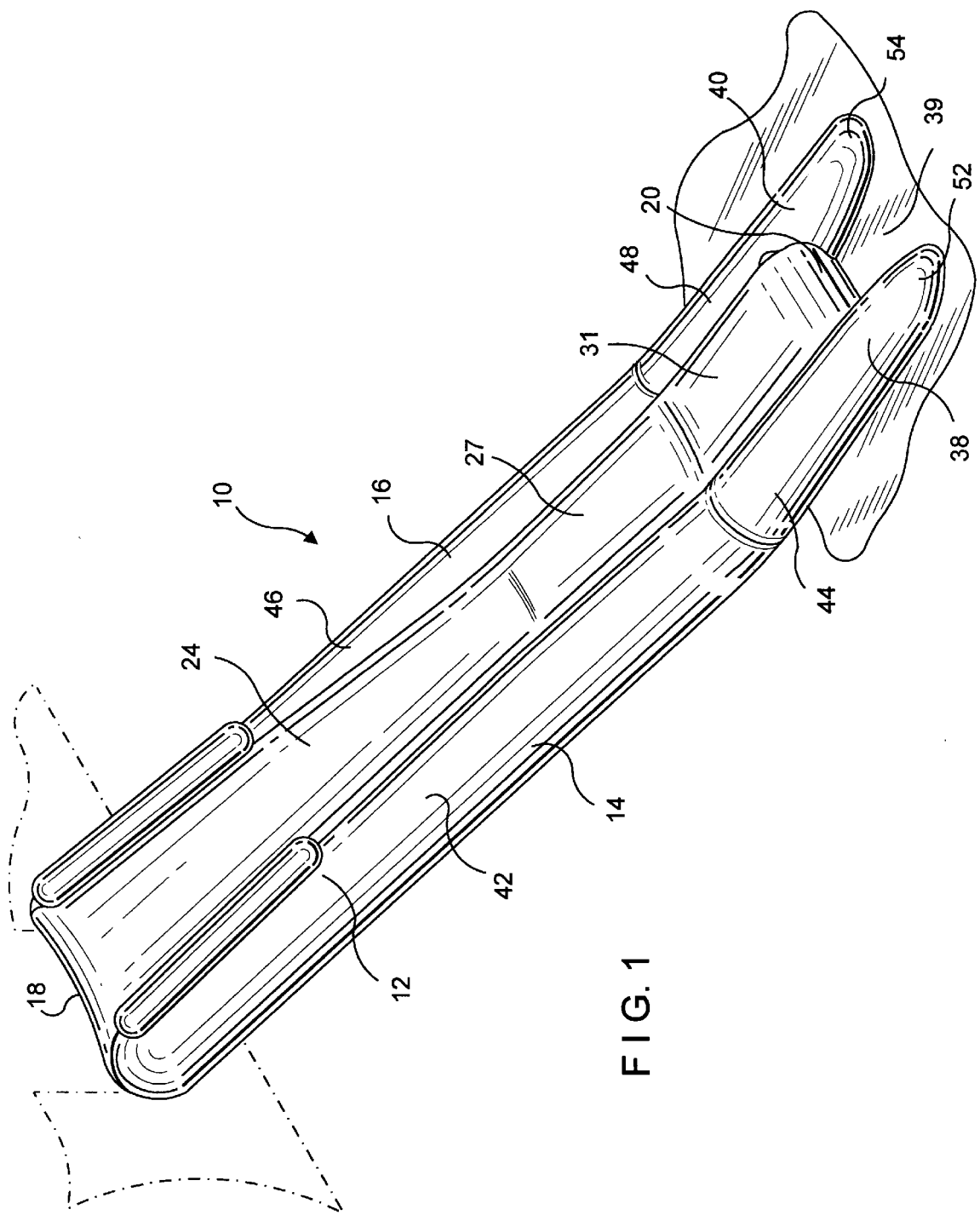
FIG. 1 is a perspective view of the inflatable evacuation slide of the invention.
Figure 7:
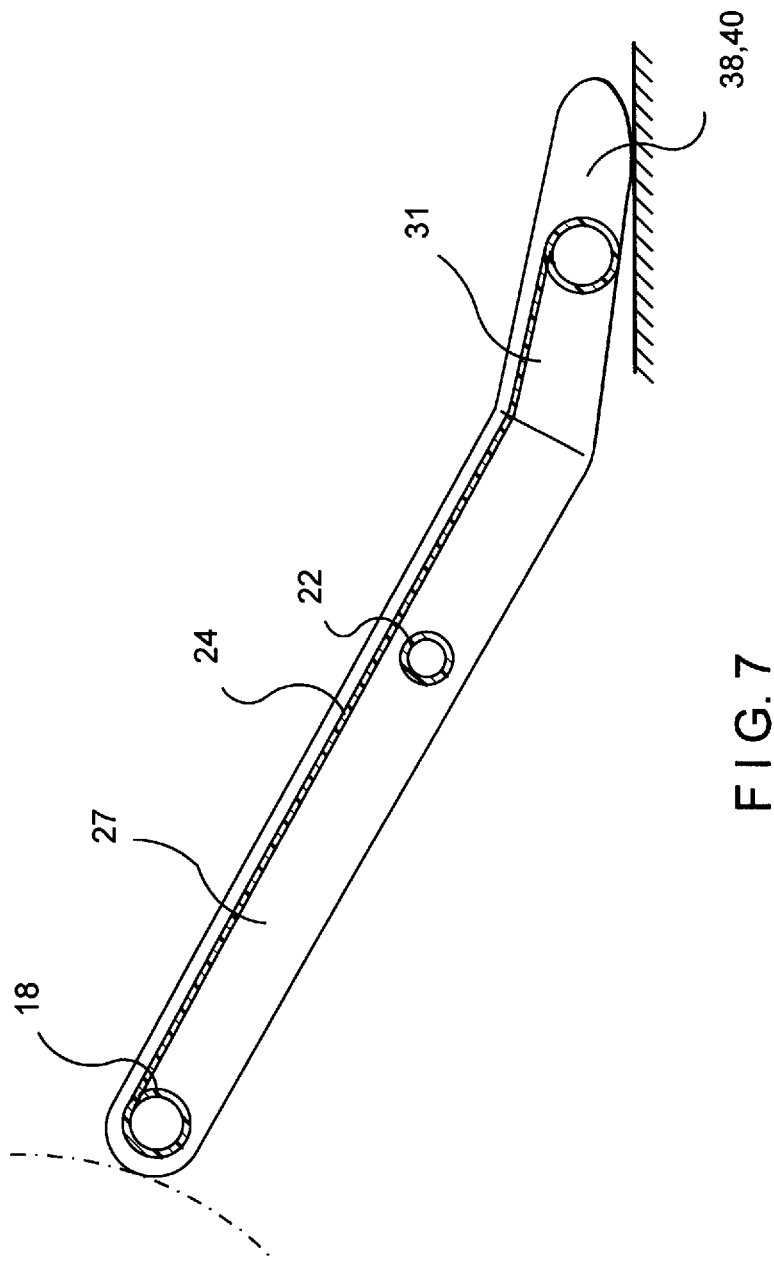
FIG. 7 is a schematical cross-sectional view according to sectional line 7—7 of FIG. 4.

Referring now to FIGS. 1–7, wherein the inflatable evacuation slide 10 of the present invention is best shown. The evacuation slide 10 comprises an inflatable beam structure 12 consisting of a first inflatable longitudinal support beam 14, a second inflatable longitudinal support beam 16, an upper inflatable transverse member 18, a lower inflatable transverse member 20 and an intermediate inflatable transverse member 22. As best illustrated in FIG. 3, the first longitudinal support beam 14 and a second longitudinal support beam 16 are spaced from each other forming an interior space 35. The first longitudinal support beam extends between its proximal end 15 and distal end 17, whereas the second longitudinal support beam is provided with a proximal end 19 and a distal end 21. The upper transverse support member 18 connects and provides communication between the distal ends 15 and 19 of the longitudinal support beams. A lower transverse support member 20 is adapted for connecting and providing communication between the lower regions of the first and second longitudinal support beams. As best shown in FIGS. 1–3, the lower support member 20 is spaced from the distal ends 17 and 21 forming extension portions 38 and 40 of the first and second longitudinal support beams, respectively. Thus, each extension portion extends between the lower support member 20 and the distal end of the respective longitudinal support beam. Thus, the extension portion 38 of the first longitudinal beam 14 extends between its area of junction with the lower support member 20 and the distal end thereof 17. Similarly, the extension portion 40 of the second longitudinal support beam 16 extends between its area of junction with the lower transverse support member 20 and the distal end thereof 21.

A flexible sliding support surface 24 is attached to the upper regions of the first 14 and second 16 longitudinal support beams as well as to the upper 18 and lower 20 transverse support members. Therefore, at the lower part of the inflatable evacuation slide of the invention, the sliding support surface 24 terminates at and does not extend beyond the lower transverse support member 20.

As best shown in FIG. 3, the first and second longitudinal support beams are formed having exterior areas 26 and 30 as well as facing each other interior areas 28 and 32, respectively. The interior space 35 of the evacuation slide is actually formed between the interior areas 28 and 32. At their distal ends the longitudinal support members are terminated by cups 52 and 54.

At the runway end of the slide, the extensions 38 and 40 are flared out to form an increased passenger receiving area 39 resembling an end opening of a trumpet. The flared passenger receiving area 39 is formed by interior surfaces of the extension portions 38,40 and by the lower support member 20. In the flared passenger receiving area 39, the extension portions 38 and 40 tend to slant away from the sliding paths, so as not to impede the egress of the evacuees. Furthermore, in that part of the slide, the extension portions provide guidance and assistance to evacuees at the final moments of their egress. Such guidance is especially important when the slide is used at a sill height above the normal level as the speed of the passengers' movement before reaching the ground can be high.

In order to reduce contacts leading to considerable friction between the ground and the extension portions especially at the normal sill height, a lower area of each extension portion is provided with an arrangement adapted for reduction of such engagement. In the embodiment illustrated in FIG. 6, such arrangement is in the form of a tapered area 62, whereas in the embodiment of FIG. 4, this arrangement is in the form of a curved area 64 provided at the bottom part of the extension portion. Furthermore, this arrangement substantially eliminates the possibility of increasing the effective length of the slide due to the extension portions at the sill height of an aircraft at the normal and below normal levels. The effective length of the slide comprises a part of the slide actively utilized in egress of the passengers. As will be described hereinbelow, in the embodiment of the invention illustrated in FIG. 4, the effective length of the slide substantially includes the length of the main part 27. In the embodiment of FIG. 5, the effective length of the slide includes both the main 27 and the runway 31 parts of the slide.

An outside cross-sectional periphery or a diameter of the upper transverse support member 18 is typically smaller than that of the central area of the longitudinal support beams 14 and 16. This is because the longitudinal bending moments are at minimum near the beam support at the aircraft and it is also desirable to reduce the inflation volume of the slide. Therefore, at a junction with the upper support member 18, the outside cross-sectional periphery or the diameters of the first and second longitudinal support beams are smaller than their diameters at the central region of the inflatable slide. The lower transverse inflatable support member 20 is a separate member interconnecting the lower regions of the first and second longitudinal beams by intersecting the interior volumes thereof. The longitudinal bending moments at the lower area of the slide are also smaller than that at the central area thereof. Therefore, an outside cross-sectional periphery or a diameter of the lower transverse support member 20 and the diameters of the lower parts of the longitudinal support members are made smaller than the diameters of the central area of the first and second longitudinal beams. In view of the above, the interior space 35 is formed having an inwardly tapered upper interior region 34 and outwardly tapered lower interior region 36 which are separated by a restricted interior region 37 formed between large diameter areas of the longitudinal beams. In the central area of the slide, communication between the first and second longitudinal support beams 14 and 16 is provided by an intermediate inflatable transverse member 22 situated in the restricted interior region 37 of the interior space of the slide.

Since the strength of an inflatable support beam, to a greater degree, depends on the diameter of the inflatable structure rather than internal pressure thereof, the invention provides the longitudinal beam structures having a larger diameter in the central area thereof, where the longitudinal bending moments are greater. This is compared to the smaller diameters at the upper and lower or runway end where the longitudinal bending moments are less.

In view of the above, the present invention provides an economical inflatable structure of the longitudinal support beams 14 and 16 which are formed having diameters at the appropriate locations sufficient to resist maximum anticipated loads, but small enough in other locations to minimize inflation volume.

The present invention utilizes any conventional method of attaching the evacuation slide at the doorways of aircraft and conventional methods of deploying and inflating the evacuation slide therefrom. Each first and second longitudinal beam 14 and 16 including respective extension portions is formed as one unitary member without any internal separation. Furthermore, from the inflating step standpoint, there is no segregation of the interior of the slide into separate sections. Therefore, the entire slide including the longitudinal support beams and extensions are inflated simultaneously by the source of inflation.

From the side elevational view perspective, which is best illustrated in FIGS. 1, 4–7, it is clear that each longitudinal support beam consists of main part 42 and 46 and runway part 44 and 48, respectively. The main part 27 of the slide extends substantially between parts 42 and 46. Similarly, a runway part 31 of the slide is formed by the parts 44 and 48 and other elements of the slide situated in this area. As illustrated in at least FIGS. 4–7, in the inflated condition of the slide 10, a longitudinal axis of the main part 27 is interposed at an obtuse angle C to the longitudinal axis A'–A' of the runway part 31. The extension portions 38 and 40 of the first and second longitudinal beams form an inseparable part of the runway part 31 of the slide.

Use of the inflatable evacuation slide 10 of the invention at the normal sill height of an aircraft, with the sliding angle B at an optimal range, is illustrated in FIG. 4. In this condition, the runway part 31 of the slide in general, and the extension portions 38 and 40 of the first and second longitudinal support beams specifically extend substantially along the ground. Thus, the active, effective length of the evacuee egress substantially extends within the main part 27 of the slide. Therefore, in this condition, the sliding angle B of the slide (which is the angle between the flexible sliding surface and the ground) corresponds substantially to the sliding angle of the main part 27 without imparting an additional sliding angle due to the runway part including the extension portions. In this condition, the extension portions 38 and 40 of the longitudinal support beams do not substantially increase the effective length of the evacuation slide and the egress of the evacuees is mainly governed by a section of the sliding surface 24 extending along the main part 27 of the slide. Similar principles apply when the evacuation slide of the invention is used at the sill height of an aircraft below the normal level with the shallow sliding angles.

When the evacuation slide of the invention is used for the adverse sill heights, with the doors of aircraft at the sill height above normal, as best illustrated in FIG. 5, the entire inflatable structure of the slide 10 including the main 27 and runway 31 parts is raised. In this condition, the value of the sliding angle B' is above the optimal range. The extension portions 38 and 40 of the longitudinal support beams are fully utilized, so that the active, effective length of the evacuee egress extends not only through the main part 27, but the runway part 31 of the slide as well. Therefore, the effective length of the slide 10 is increased substantially by the length of the runway part including the length of the extension portions 38 and 40. In view of the above, the invention provides the evacuation slide having the increased effective length at the sill height of an aircraft above the normal level and the effective length without substantial increase at the normal and below normal sill height levels thereof. This arrangement also enables the invention to provide the sliding angle approaching the optimal range at the normal or below normal sill height and having an acceptable sliding angle at the sill height above normal level.

Thus, the extension portions 38 and 40 of the first and second longitudinal support beams are used only to increase the effective lengths of the slide and to provide an acceptable sliding angle when the slide is used at the sill height above normal level, whereas the effective length of the slide is virtually unincreased when the sliding angle is near an optimal range at the normal sill height.

Formation of the flared passenger receiving area 39 provides a wide space region at the runway end of the slide. Such highly visible enlarged landing area enables the invention to minimize a psychological barrier to the evacuees at the earlier stage of evacuation while they are ready to jump on the slide. When the evacuees initially enter the inflatable evacuation slide of the invention, they are received by a portion of the sliding support surface 24 corresponding to a wide part of the upper inwardly tapered interior region 34, funneled through the restricted region 37 and delivered to the outwardly tapered lower interior region 36. As the evacuees come down the slide, they are discharged at the flared passenger receiving area 39 formed substantially by the interior surfaces of the extension portions 38 and 40. At the end of egress, the main load of the evacuees is absorbed at the lower interior region 36 receiving area, enabling the invention to dampen their velocity. This design provides comfortable feeling to the individuals while they are moving along the slide.

The sliding surface 24 is formed as a flexible sheet of material which is bonded or otherwise secured to the first and second longitudinal beams 14 and 16. At the upper and lower ends, the sliding surface is attached by any conventional means to the upper and lower transverse support members 18 and 20, respectively. It has been discussed hereinabove that the diameters of the lower transverse member 20 is smaller than the diameters of the first and second longitudinal beams 14 and 16, respectively. Furthermore, it is illustrated in FIGS. 1, 4–7, that an upper level of the lower transverse support member 20 is lower than the upper level of the longitudinal beams. In view of that, at least at the runway end, the sliding surface 24 is disposed below the upper surface of the longitudinal beams 14 and 16 forming lateral restraining means for the evacuees.

Furthermore, such arrangement causes the fabric of the sliding surface 24 to yield so as to increase frictional resistance and to reduce the rate of descent of the evacuees without tending to spring back and produce a trampoline effect.

In use, a passenger initially drops at maximum speed at the part of the sliding surface 24 corresponding to the upper inwardly tapered interior region 34. As the passenger progresses down the slide, the speed gradually decreases until he/she reaches the end of the lower inwardly tapered interior region 36. At the lower transverse support member 20, upon approaching the restraining arrangement, engagement of the lower end of the sliding surface with the back of the legs slows the passenger abruptly. At this point of evacuation, the passenger is seated upon the lower transverse support member 20 with his/her feet situated in the flared passenger receiving area 39 and hands guided by the extension portions 38 and 40 of the first and second longitudinal support members. Then, the passenger needs merely stand up and move away from the slide to complete the evacuation.

We claim:

1. An inflatable evacuation slide for an aircraft, comprising:

first and second longitudinal support beams spaced from each other, each said first and second support beams having proximal and distal ends;

an upper support member, said upper support member being transverse to and interconnecting said proximal ends of said first and second longitudinal support beams;

a lower support member, said lower support member being transverse to said first and second longitudinal support beams and substantially spaced from said distal ends, each said longitudinal support beam being formed with an extension portion extending between said lower support member and a free end thereof at the respective distal end; and a flexible sliding support surface, said flexible sliding support surface extending between and terminated at said upper and lower support members, so that an unobstructed passenger receiving area is formed between said extension portions of the first and second support beams and said lower support member.

2. The evacuation slide of claim 1, wherein each said longitudinal support beam includes an exterior area and an interior area, said interior areas of said first and second longitudinal support beams face each other to define an interior space therebetween and said flexible support surface is also connected to said first and second longitudinal support beams.

3. The evacuation slide of claim 2, wherein said interior space is formed having an upper inwardly tapered interior region and a lower outwardly tapered lower interior region separated by a restricted region, whereby passengers upon entering said evacuation slide are received by a portion of said sliding support surfaces corresponding to said inwardly tapered upper interior region, funneled through said restricted region and discharged at said outwardly tapered lower interior region.

4. The evacuation slide of claim 3, wherein a cross-sectional outside periphery of said first and second longitudinal support beams at a central part of the slide being larger than a cross-sectional outside periphery of said first and second longitudinal beams at said proximal and distal ends, so that said restricted region is formed substantially by said longitudinal support beams at the central part of the slide between said outside periphery of the first longitudinal support beam and said outside periphery of the second longitudinal support beam.

5. The evacuation slide of claim 3, wherein said outwardly tapered lower interior region terminates at a flared passenger receiving area.

6. The evacuation slide of claim 5, wherein said flared passenger receiving area is formed by interior surfaces of said extension portions and said lower support member.

7. The evacuation slide of claim 1, wherein an upper part of said lower support member being positioned below an upper portion of said first and second longitudinal support beams, so that a lower end of the flexible sliding surface is disposed below the upper portion of the longitudinal support beams forming a lateral restraining arrangement for the evacuees.

8. The evacuation slide of claim 1, wherein each said longitudinal support beam including its extension portion is formed as one unitary member without any internal separation and an interior of said evacuation slide is one continuous system capable of being simultaneously inflated.

9. The evacuation slide of claim 1, wherein a lower part of each said extension portion is formed with an arrangement adapted for reducing an engagement area between said extension portions and a ground surface.

10. The evacuation slide of claim 9, wherein said reducing arrangement is a curved region provided at a low area of the distal end of said extension portions.

11. The inflatable evacuation slide of claim 9, wherein said arrangement is a tapered region provided at a low area of the distal end of said extension portions.

12. The evacuation slide of claim 1, wherein when said slide is in use in a first position said extension portions of said first and second longitudinal support beams are adapted to extend substantially along a ground surface; and when in use in a second position said extension portions are adapted to be raised substantially above the ground surface.

13. The evacuation slide of claim 1, wherein said first and second longitudinal support beams further comprising upper and lower areas and said flexible sliding support surface is also connected to said lower areas of the first and second longitudinal support beams.

* * * * *